(12) United States Patent
Dean

(10) Patent No.: US 7,974,573 B2
(45) Date of Patent: Jul. 5, 2011

(54) REPEATER OPEN LOOP GAIN MEASUREMENT

(75) Inventor: Richard Finch Dean, Lyons, CO (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 11/668,423

(22) Filed: Jan. 29, 2007

(65) Prior Publication Data

US 2007/0188235 A1 Aug. 16, 2007

Related U.S. Application Data

(60) Provisional application No. 60/762,772, filed on Jan. 27, 2006.

(51) Int. Cl.
*H04B 1/60* (2006.01)
*H04K 3/00* (2006.01)

(52) U.S. Cl. .................. 455/9; 455/15; 455/24; 375/213

(58) Field of Classification Search .............. 455/9, 15, 455/24, 127.2, 127.3; 375/211, 213
See application file for complete search history.

(56) References Cited

U.S. PATENT DOCUMENTS

| | | | | |
|---|---|---|---|---|
| 2,810,072 | A * | 10/1957 | Amatniek | 327/185 |
| 5,095,528 | A | 3/1992 | Leslie et al. | |
| 2002/0044594 | A1 * | 4/2002 | Bongfeldt | 375/213 |
| 2003/0123401 | A1 | 7/2003 | Dean | |
| 2004/0106382 | A1 | 6/2004 | Fisher et al. | |

FOREIGN PATENT DOCUMENTS

| | | |
|---|---|---|
| EP | 0227393 | 7/1987 |
| JP | 64062926 | 3/1989 |
| JP | 02090711 | 3/1990 |
| JP | 2000506340 | 5/2000 |
| JP | 2004186829 | 7/2004 |
| WO | WO9733381 | 9/1997 |

OTHER PUBLICATIONS

International Search Report—PCT/US2007/061251, International Searching Authority—European Patent Office—May 14, 2007.
Written Opinion—PCT/US2007/061251, International Searching Authority—European Patent Office—May 14, 2007.
International Preliminary Report on Patentability—PCT/US2007/061251, International Bureau of WIPO-Geneva, Switzerland—Jul. 29, 2008.
Translation of Office Action in Japanese application 2008-552618, corresponding to U.S. Appl. No. 11/668,423, citing JP 02-090711, JP 2000-506340, U.S. 2004106382, JP 64-062926, and JP 2004-186829, dated Oct. 5, 2010.

* cited by examiner

*Primary Examiner* — Lee Nguyen
(74) *Attorney, Agent, or Firm* — James D. McFarland; Linda G. Gunderson

(57) ABSTRACT

A repeater is configured so as to detect feedback oscillation conditions by detecting a gain parameter, and responding to the detected gain parameter by reducing the gain when the loop gain approaches unity. When used in a framed shared channel wireless communication systems, feedback oscillation conditions the loop gain of the repeater may be adjusted so as to permit operation of the repeater outside of the oscillation range. The invention is particularly useful when the repeater is used in a framed shared channel wireless communication system.

35 Claims, 7 Drawing Sheets

REPEATER OPEN LOOP GAIN MEASUREMENT

RELATED APPLICATIONS

This application claims priority to U.S. Provisional Application No. 60/762,772, filed Jan. 27, 2006, which is incorporated by reference herein.

BACKGROUND OF THE INVENTION

1. Field of the Invention

This invention relates to measuring and testing of radio frequency circuits. More particularly, the invention relates to measuring and testing of loop gain signal conditions including conditions conducive to unwanted oscillation, such as may be present in signal repeater stations.

2. Background

Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Repeaters are used in wireless communication systems in order to extend the range and coverage of the communication system. In general, repeaters receive and retransmit signals at the physical layer, and are able to provide satisfactory operation regardless of the standard being used by the wireless communication system. Repeaters are advantageous in that they provide an economical means to extend the range of a framed shared channel wireless communication system, particularly in cases where sufficient capacity exists, but signal propagation is difficult.

The simplicity of repeaters results in a problem with radio frequency feedback. Repeaters in wireless communication systems are troubled by insufficient antenna isolation between the coverage and donor antenna in a repeater system. The closed loop formed by the antennas and the repeater RF gain can cause an oscillation at the operating frequency of the repeater if the isolation between the antennas is less than the repeater gain. Since the repeater receives and retransmits at the physical signal layer, there may be no inherent distinction between the received and retransmitted signals to provide filtering of the feedback signals. The repeater exhibits gain instability when the gain of the repeater approaches the pathloss between the transmit and receive antennas of the repeater. This condition is equally likely to occur on the forward link or reverse link of the repeater.

Methods to measure the antenna isolation during installation of the repeater are cumbersome, and require test equipment that may be elaborate or cumbersome. The environment can change after the installation, leading to instability and requiring further adjustments. Therefore, it is desired to provide for an ability to sense and correct an instability condition in repeaters and similar amplifier apparatus.

SUMMARY

According to the present invention, loop gain in a communication system is measured by obtaining a gain measurement of a signal amplifier, introducing either a change of gain or change of input power and detecting an oscillation condition of a resultant corresponding change of gain measurement. The oscillation condition of the resultant corresponding change may be used to determine the gain stability of the amplifier. The gain may be adjusted by incrementally increasing or decreasing the gain of the amplifier, so that the signal does not become unstable.

According to a further aspect of the invention, a device measures loop gain in a signal path which includes an amplifier. An input device in communication with an input of the amplifier introduces a change of gain or input power to the amplifier and a detector at the amplifier output obtains a gain measurement. A control circuit then detects an oscillation condition of a resultant corresponding change of gain measurement of the amplifier and determines gain stability by using the oscillation condition of the resultant corresponding change of gain.

In a further aspect of the invention, a program storage device embodying executable instructions is used to determine gain stability of a signal amplifier, using gain measurements of a signal amplifier. A change of gain or input power to the signal amplifier is introduced and an oscillation condition of a resultant corresponding change of gain measurement of the signal amplifier is detected. The gain stability is obtained from the resultant corresponding change of gain measurement of the signal amplifier is detected. The gain stability is obtained from the resultant corresponding change of gain measurement of the signal amplifier.

In another aspect, a signal amplifier is capable of automatic adjustment of gain in a repeater system. The signal amplifier includes a circuit for obtaining a gain measurement of the amplifier and a control circuit for introducing change of gain or input power. An oscillation condition is detected and the gain is adjusted until the oscillation condition change falls within a predetermined threshold of stability or below a threshold of measured instability.

BRIEF DESCRIPTION OF THE DRAWINGS

The features, nature, and advantages of the present invention will become more apparent from the detailed description set forth below when taken in conjunction with the drawings in which like reference characters identify corresponding items throughout and wherein.

DETAILED DESCRIPTION OF THE INVENTION

Figure 1:
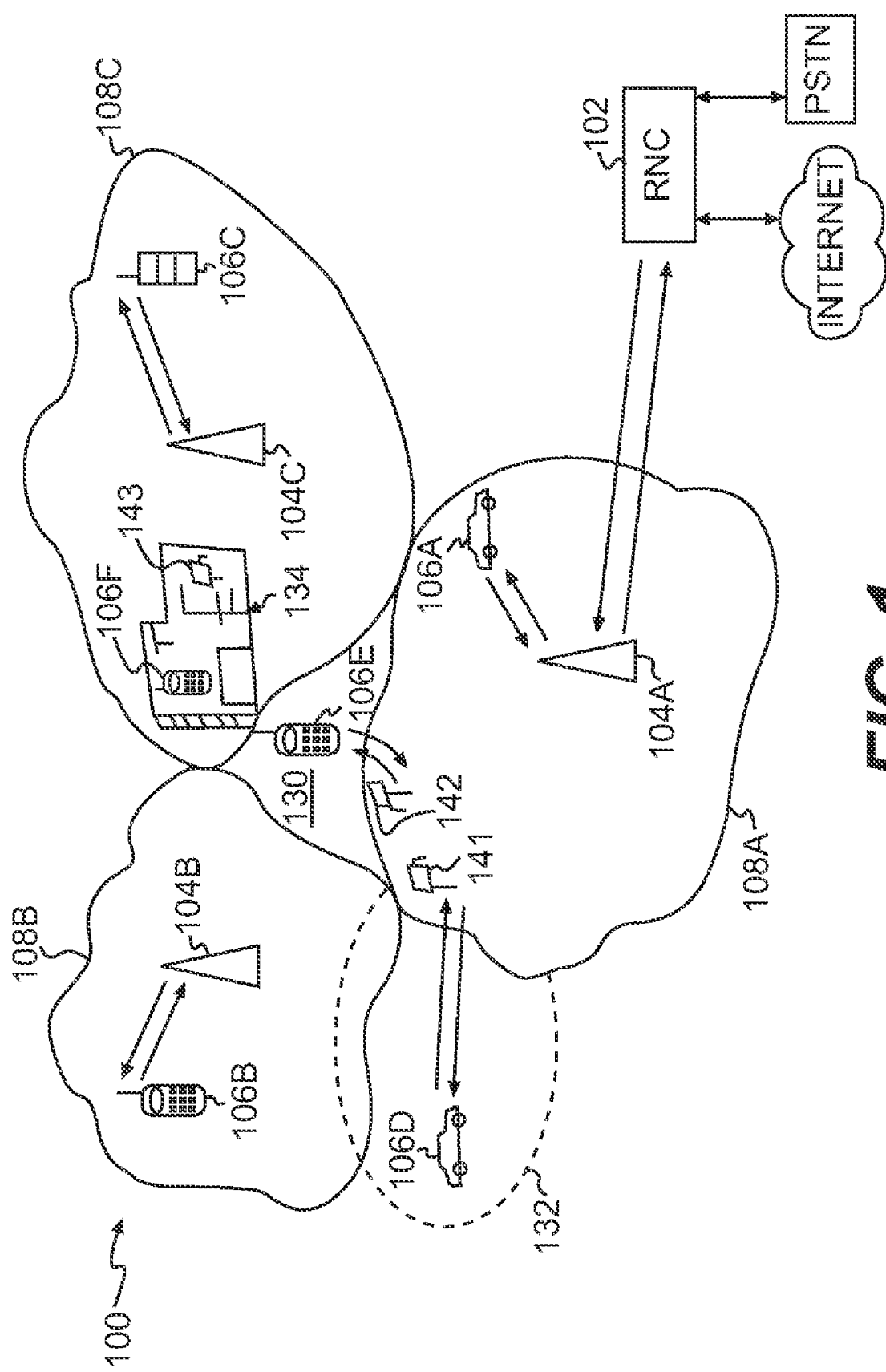
FIG. 1 is a diagram illustrating an example of a wireless communication network.

The word "exemplary" is used herein to mean "serving as an example, instance, or illustration." Any embodiment described herein as "exemplary" is not necessarily to be construed as preferred or advantageous over other embodiments.

Overview

The invention provides a repeater, useful in various communication systems, including single user and multi-user wireless communication systems, framed shared channel wireless communication systems, and in systems using various wireless protocols such as CDMA protocols. According to the invention, feedback oscillation conditions are detected and in which gain of the repeater may be adjusted in accordance with the detection of an oscillation condition.

Loop gain in a repeater can be described as the gain of repeater and isolation between donor and server antennas. As the loop gain gets close to unity (or 0 dB) a small change in gain or input power causes a large change in output power. By introducing small changes of gain or input power and detecting the resultant change, gain stability can be estimated. If stability is sufficiently poor and exceeds a threshold of measured instability, the conditions for oscillation are considered to be high, and action could be taken in the repeater to reduce gain and thereby increase stability.

According to the present invention, the loop gain of the repeater system, comprised of repeater gain, antennas plus path loss between the donor and server antennas, is measured as a method of detecting the oscillation condition. The oscillation condition is considered to exist if the loop gain is at or near unity. The particular value chosen as the oscillation condition is the threshold of instability. In response to a measured loop gain at or near unity, adjustments are made in order to remedy or reduce the oscillation condition. Thus, if the loop gain is at or near unity, then corrections are made in order to reduce the repeater gain. In one aspect, the repeater gain is reduced as necessary to remedy the oscillation condition. Alternatively, with the measured repeater gain, it is possible to make physical or other adjustments in the repeater. In addition to adjusting amplifier gain, it is possible to make other adjustments, such as physical adjustments in the position of the repeater or repeater antennas, thereby reducing the gain of the feedback loop. The open loop gain is measured by measuring the gain of the repeater system. The gain of the amplifier may be then reduced, or attenuation to the signal may be increased, which results in a reduction of the loop gain. The reduction in gain may be continued as required in order to avoid the oscillation condition.

In a further embodiment of the invention, the measurements of the repeater gain are automatically effected during the operation of the repeater. The measurements are then reported as a value that can be used in order to maintain repeater gain at a sufficiently low level to maintain gain stability.

According to one aspect of the present invention, a variable attenuator and a RF power detector are embedded in the a gain path of a repeater amplifier. During operation or installation of the repeater, the variable gain or attenuation is used to cause a change the RF gain by a small, predetermined incremental amount. The RF power detector is then used to determine if the RF power changed by a similar amount. If the amount of change detected by the power detector is more than the change in value of the variable attenuator, then the loop gain is at or near unity, the value that can cause oscillation.

In a stable case, a change in attenuation of the attenuator results in a loop gain that is less than or equal to unity. This is the result of the pathloss between the transmitting antenna and the receiving antenna exceeding the amplifier gain. Gain instability occurs as the loop gain approaches unity, implying that the amplification is greater than pathloss between the transmitting and receiving antenna. If the amount of change detected by the power detector exceeds the amount by which the amplification by which the amplification was changed, that value is presumed to present the possibility of oscillation. If the amount of change detected by the power detector is less than or equal to the amount by which the amplification by which the amplification was changed, the repeater is presumed stable as far as open loop gain stability is concerned.

By measuring changes in loop gain as a result of gain or attenuation perturbations, it is possible to determine the condition of open loop gain stability. A benefit of this technique is that the repeater can remain in service so long as the power changes are small enough so that the technology supported by the repeater does not degrade with the (small) power fluctuations. As an example, CDMA cellular signals could tolerate small steps in power, e.g, 1 dB steps, without noticeable degradation being detected by the user.

There are several possible implementations to detect that the loop gain is close to or greater than unity, or to respond to such detection. Examples are:

The value of the attenuator is reduced a small amount and the power detector checked to see if the power increases a like amount.

If the power detector reports a change larger than the attenuator change, the repeater takes action to reduce the gain to prevent oscillation.

The value of the attenuator is increased a small amount and the power detector checked to see if the power decreased a like amount. If the power detector reports a change larger than the attenuator change the repeater takes action to reduce the gain to prevent oscillation.

The gain of the amplifiers is increased and decreased. This technique is advantageously performed with variable gain amplifiers.

The value of the attenuator is dithered a small amount and the power detector checked to see if the power changes are of similar proportion to the dithering. If the power changes are larger than the attenuator dither, the repeater takes action to reduce the gain to prevent oscillation. There may be optimum rates for the dithering so as to minimize the impact to the desired repeated signal. There may be optimum amplitudes for the dithering so as to minimize the impact to the desired repeated signal. Knowledge of the attenuator dithering pattern allows the power detector to synchronously detect the power changes for greater accuracy and sensitivity. The dithering signal could be periodic or random, so as to minimize the impact to the desired repeated signal.

The setting of the attenuators and checking of power sensors could be done via a processor under software control, or it could be implemented in hardware as a digital state machine. In addition, it could be implemented in analog circuitry with gain blocks and comparison circuits.

The amplitude perturbations could also be embodied as AM modulation added to the repeater amplifier path. In order not to disturb the wireless communication the AM modulation index may be made quite low, so that very little power is in the AM signal. The advantage of this type of perturbation could be the ability to perform a continuous measurement of the system stability. A second advantage could be the ability to have smaller perturbations, due to the ability to integrate over longer time periods with unique perturbation waveforms.

Operational Environment

FIG. 1 is a diagram illustrating an example of a wireless communication network (hereinafter "network") 100 using one or more radio network controllers (RNCs) 102, or local control stations such as base station controllers (BSC) or Node Bs, and a plurality of base stations (BS) 104A-104C, sometimes referred to as base station transceiver systems. Base stations 104A-104C communicate with remote stations or wireless communication devices (WCDs) 106A-106C that are within service areas 108A-108C of base stations 104A-104C, respectively. In the example, base station 104A communicates with WCD 106A within service area 108A, base station 104B with WCD 106B within service area 108B, and base station 104C with WCD 106C within service area 108C.

WCDs 106A-106C each have or comprise apparatus for wireless communications such as, but not limited to, a cellular telephone, a wireless handset, a data transceiver, or a paging or position determination receiver. Furthermore, such WCDs can be hand-held, portable as in vehicle mounted (including cars, trucks, boats, trains, and planes) or fixed, as desired. Wireless communication devices are also sometimes referred to as user terminals, mobile stations, mobile units, subscriber units, wireless transmit/receive units, mobile radios or radiotelephones, wireless units, or simply as "users", "phones", "terminals", or "mobiles" in some communication systems, depending on preference.

Base stations 104A-104C transmit information in the form of wireless signals to user terminals across forward link communication channels (forward links or downlinks), and WCDs transmit information over reverse link communication channels (reverse links or uplinks). Base stations 104A-104C may form part of a wireless communication system, such as a terrestrial based communication systems and networks that include a plurality of cell sites. Signals can be formatted in accordance with any appropriate standard, such as IMT-2000/UMT standards, using WCDMA, CDMA2000 or TD-SCDMA type signals. Additionally, base stations 104 can be associated with other systems such as analog based communication system (such as AMPS), and transfer analog based communication signals. WCDs 106A-106C and base stations 104A-104C use signals that are encoded, spread, and channelized according to the transmission standards of the network. By way of example, a forward CDMA link includes a pilot channel or signal, a synchronization (sync)-channel, several paging channels, and a larger number of traffic channels, while the reverse link includes an access channel and a number of traffic channels. The signals use data frames having a predetermined duration, such as 20 milliseconds. These parameters are by way of example, and the present invention may be employed in systems that employ other wireless communication techniques.

The wireless signals are transmitted at power levels sufficient to overcome noise and interference so that the transfer of information occurs within specified error rates; however, these signals need to be transmitted at power levels that are not excessive so that they do not interfere with communications involving other WCDs. Faced with this challenge, base stations and WCDs in some communication techniques employ dynamic power control techniques to establish appropriate transmit power levels. By way of example, some approaches involve a user terminal determining signal-to-noise ratios (SNRs), signal-to-interference ratios (SIR) or error rates (BER, FER, etc.) of received forward link traffic signals, and requesting the base station to either increase or decrease the transmit power of traffic signals sent to the WCD based on the results. In addition to transmitting up/down commands, other types of information may be transmitted to base stations periodically including various power and noise measurements to support operations, such as "handoffs" between base stations. Examples of techniques for exercising power control in such communication systems are found in U.S. Pat. No. 5,383,219, entitled "Fast Forward Link Power Control In A Code Division Multiple Access System," U.S. Pat. No. 5,396,516, entitled "Method and System for The Dynamic Modification of Control Parameters in a Transmitter Power Control System," and U.S. Pat. No. 5,056,109, entitled "Method and Apparatus for Controlling Transmission Power in a CDMA Cellular Mobile Telephone System."

Local topography, obstructions (buildings, hills, and so forth), signal strength, and interference from other sources dictate the shape of the region serviced by a given base station. Typically, multiple coverage areas 108 (108A-108C) overlap to provide continuous coverage or communications over a large area or region; however there are some areas that may not be covered, such as uncovered regions 130 and 132. Uncovered regions, such as a hole 130 or a region 132, that are outside of the network's normal coverage areas result in intermittent service. Additionally, topological features such as mountains or hills, man made structures, such as tall buildings or urban canyons often created in central urban corridors, or vegetation, such as tall trees, forests, or the like, could each partially or completely block signals. Similar conditions exist inside structures 134.

In many cases, it may also be more amenable to using one or more repeaters to extend coverage to holes or uncovered regions. One technique of extending coverage is through the use of repeaters 141-143. Repeaters 141-143 accept transmissions from both a WCD 106 (106D, 106E and 106F) and a base station 104A or 104C, and act as an intermediary between the two, essentially operating as a "bent pipe" communication path. By using a repeater 141-143, the effective range of a base station 104 is extended to areas 130, 132 and 134 that would otherwise have gaps in coverage.

Significantly, repeaters typically are not controlled by radio network controllers. Repeaters generally function at the physical level and generally do not process the signals at the logical level, and so the repeater transfers signals with the data at the logical level unchanged. While the use of repeaters is a more cost effective way to increase range or coverage for base stations, the antennas of the repeater is intended to have sufficient isolation to prevent feedback oscillation.

Repeater Operation

Figure 2:
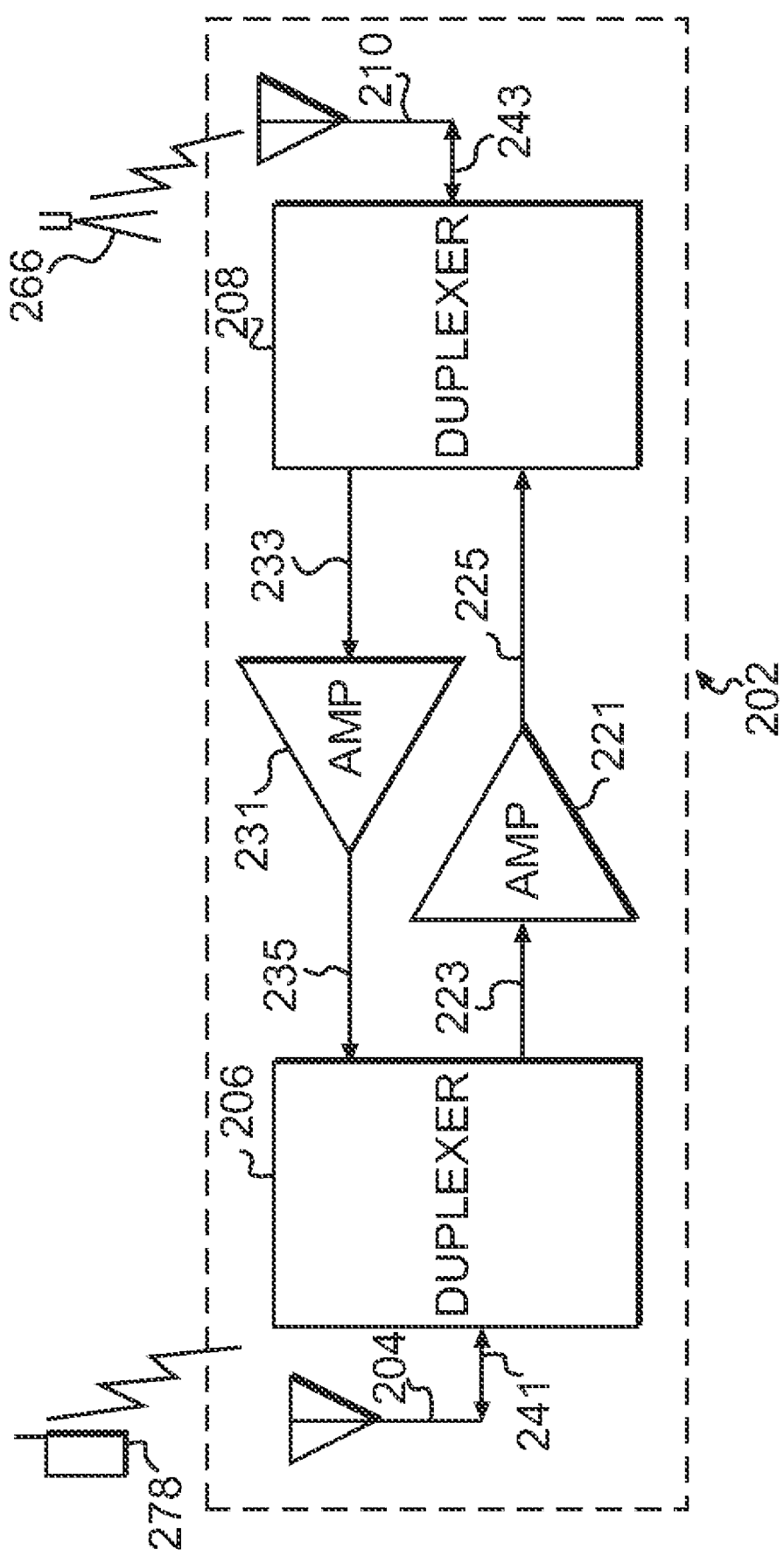
FIG. 2 is a schematic block diagram showing a repeater used in accordance with the present invention.

FIG. 2 is a schematic block diagram showing a repeater 202 used in accordance with the present invention. Repeater 202 includes a server antenna 204, a server duplexer 206 a donor duplexer 208 and a donor antenna 210. A reverse link amplifier 221 is connected to the server duplexer 206 by an input link 223 and to the donor duplexer 208 by an output link 225. A forward link amplifier 231 is connected to the donor duplexer 208 by a forward link connection input 233 and is connected to the server duplexer 206 by a forward link connection output 235. A server antenna link 241 connects the server antenna 204 to the server duplexer 206 and a donor antenna link 243 connects the donor antenna 210 to the donor duplexer 208. The reverse link and forward link amplifiers 221, 231 may be configured as multiple amplifiers, such as a low noise amplifier and a power amplifier.

While duplexers are shown, it is possible to construct repeater 202 with discrete transmit and receive antennas on both the server side (antenna 204) and the donor side (antenna 210).

In the forward operation, the donor antenna 210 receives a wireless signal from a base station 266. The donor antenna 210 transmits the received signal to the donor duplexer 208 through the donor antenna link 243. The donor duplexer 208 receives the signal and transmits the signal to the forward link amplifier 231. The forward link amplifier 231 amplifies the signal from the donor duplexer 208 and transmits the signal to the server duplexer 206. The server duplexer 206 receives the signal and transmits the signal to the server antenna 204 through the server antenna link 241. The server antenna 204 receives the signal from the server duplexer 206 and transmits a wireless signal to a WCD 278 such as a mobile phone.

In the reverse operation, the server antenna 204 receives communication signal from a communication device 278. The server antenna 204 transmits the received signal to the server duplexer 206 through the server antenna link 241. The server duplexer 206 receives the received signal and transmits the received signal to the reverse link amplifier 221 through input link 223. The reverse link amplifier 221 amplifies a communication signal from the server duplexer 206 and transmits the signal to the donor duplexer 208 through the output link 225. The donor duplexer 208 receives the signal from the reverse link amplifier 221 and transmits the signal to the donor antenna 210 through the donor antenna link 243. The donor antenna 210 receives the signal from the donor duplexer 208 and transmits a wireless signal to the base station. This reverse operation comprises the reverse link of the repeater for communication from the WCD to the base station 266.

Repeaters are typically high-gain devices, and so a variable-gain wireless repeater set to its maximum will often have more than enough gain to overcome the isolation loss between the transmit and the receive (output and input) connections. This results in a feedback loop between the transmit output at the donor antenna and the receive input at the server antenna, or vise versa a feedback loop can exist between the server antenna and the donor antenna. When this happens the repeater essentially becomes an oscillator and is detrimental to the wireless network. It would be beneficial to know at approximately what gain setting this metamorphosis takes place, so that oscillation can be avoided. The goal of this investigation is to develop a "calibration" procedure which will determine the maximum safe operating gain.

Figure 3:
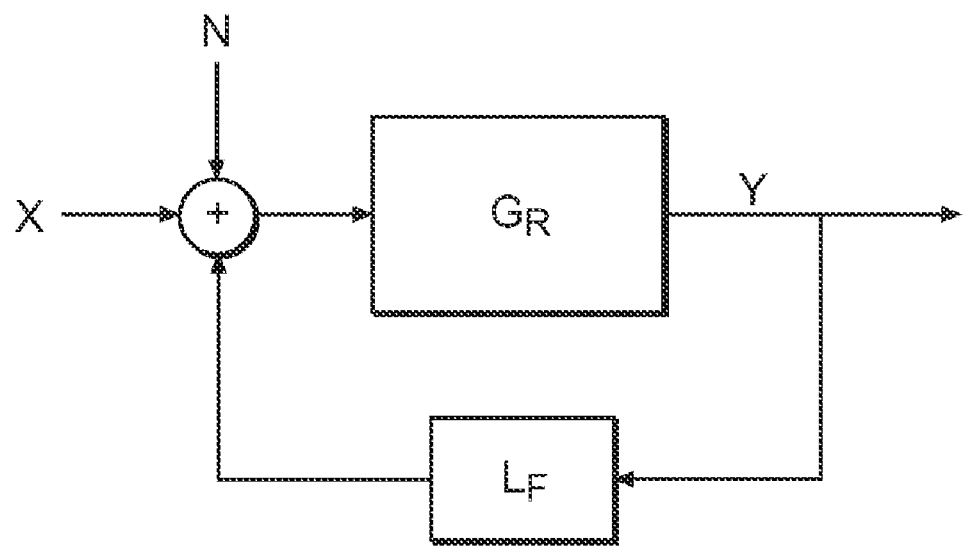
FIG. 3 is a block diagram of a simple linear model of a single repeater link.

FIG. 3 is a block diagram of a simple linear model of a single repeater link. The diagram includes block $G_R$, representing a power gain of the repeater, a block $L_F$, representing the isolation between the donor and serving antenna connectors (, FIG. 2), or server and donor, and a signal combiner represented by the "+" symbol. The isolation at block $L_F$ is the pathloss value representing the pathloss between the antenna connectors of the repeater $G_R$. If the power gain $G_R$ exceeds the isolation or pathloss $L_F$, then the output will again be amplified by the repeater, resulting in excess feedback. The signal n represents the internal noise of the repeater, referred to the input. The signal x represents the external input signal. This model can represent either the forward or the reverse link path through the repeater. For the forward-link, x represents the pilot and overhead channels, plus any traffic. If the repeater is configured such that the repeater gain $G_R$ is significantly less than the isolation or pathloss $L_F$, then signal quality is generally determined by the internal noise n relative to the external input signal x.

If one is to ignore frequency dependence, the input-output relationship y can be written as $$y = G_R\left(x + n_R + \frac{y}{L_F}\right).$$

If the output is expressed as a function of the repeater gain we have $$y = \frac{(x + n_R)G_R}{1 - \frac{G_R}{L_F}}.$$

When the repeater gain is small compared to the isolation ($G_R \ll L_F$), it can be seen that the output power will increase linearly with the repeater gain for a fixed input. The point where the repeater gain equals the isolation establishes a pole. As the repeater gain approaches the pole, it is expected that the output power will take increasingly large steps for a fixed increment in gain. It would be advantageous to find a way to detect the approximate gain at which the output power, as a function of gain, goes nonlinear.

Effect of Attenuation

Figure 4:
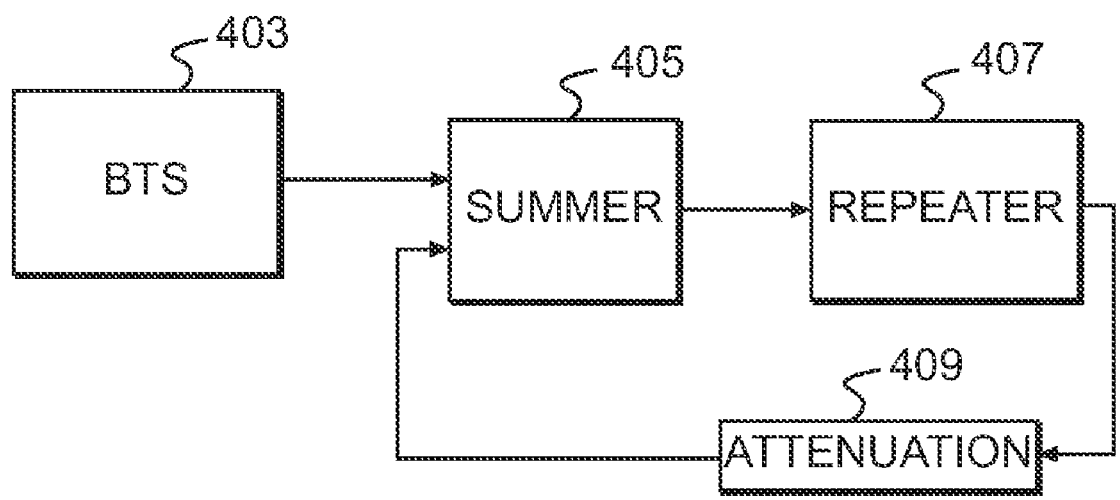
FIG. 4 is a schematic block diagram of a basic RF amplifier simulator used to describe the behavior of a repeater.

FIG. 4 is a schematic block diagram of a basic RF amplifier simulator used to describe the behavior of a repeater, and includes a base station transceiver subsystem (BTS) 403, a splitter 405, a repeater 407 and an attenuator 409. The repeater 407 provides its output to the attenuator 409, and the output of the attenuator 409 and the output of the BTS simulator 403 are applied as inputs input of the summer, which is in turn provided to the repeater 407. To test the behavior of a repeater, the system shown in FIG. 4 can be used. The repeater output power is measured using the power detectors for which one quantum at the A/D corresponds to about one-half dB. The initialization software begins with the repeater's internal attenuators set to their maximum so that the repeater gain is at a minimum. Then software control decreases the attenuation (both forward and reverse) by small amounts, for example, one dB at a time, pausing to collect 10 power readings at each attenuation setting.

The relationship between output power and feedback attenuation is non-linear, even at low repeater gain (high attenuation). Instead, relationship is that the gain increases at an approximately exponential rate as attenuation decreases. In some instances, the thermal noise floor, non linearities, and intermodulation products generate enough power such that at the repeater appears to have a loop gain much less than one.

Detection Algorithms

If the slopes of these curves are used as an input to a calculation of the threshold of instability, one complication is the nonlinearity of the programmable attenuators used in the repeater. The averaging of the power measurements vs. repeater attenuation settings may reduce the impact of the noise variance on output, with artifacts of attenuator range changes and other sources of differential nonlinearity having some effect on this output.

A simple method of estimating this curve's slope is to use the first-difference form:

$$y_n = x_n - x_{n-1}.$$

It is desirable to smooth the data to reduce the impacts of the attenuator's nonlinearities. One way to do this is by running the averaged samples through a single-pole IIR (infinite impulse response) filter of the form:

$$y_n = (1-\alpha)x_n + \alpha y_{n-1}.$$

The sample averages are processed through the filter and the difference is computed in the order in which they were collected (highest attenuation first), and the first input is also used to initialize the state of the IIR to minimize the initial transient response. In some cases, differencing and then filtering may have a different effect from differencing.

Other methods could be used to smooth the data, including accumulating more samples and averaging those samples, and/or using sliding box car filters.

Open Loop Stability Control

Figure 5:
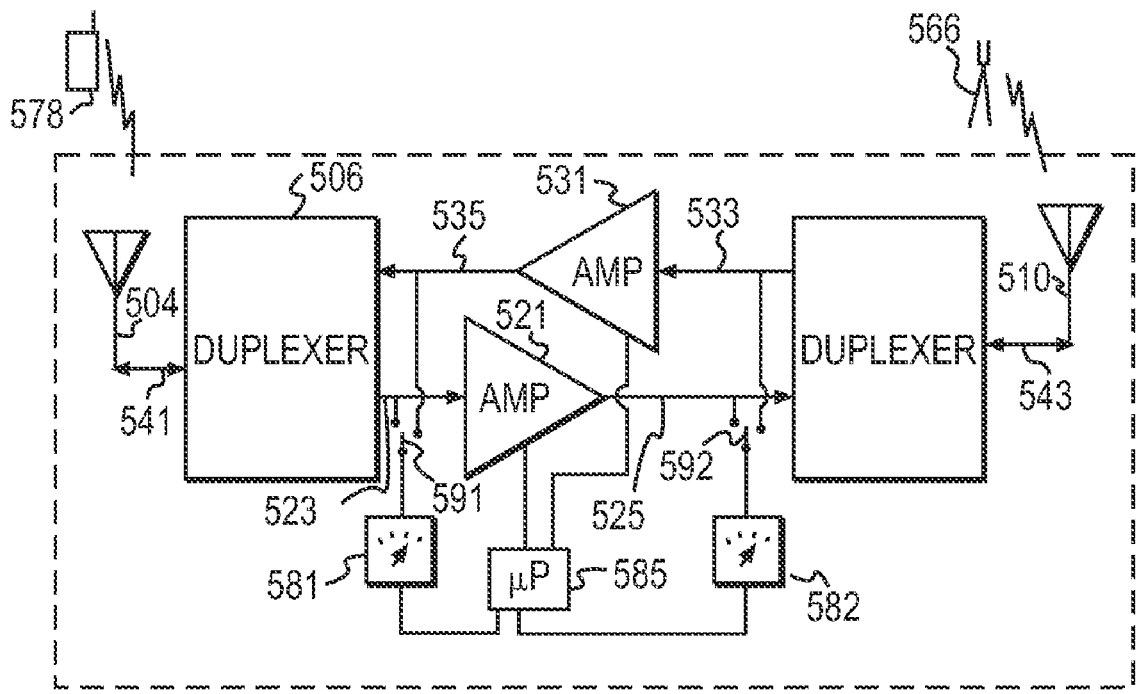
FIG. 5 is a schematic block diagram showing a repeater in which automatic adjustment to control open loop stability is implemented.

FIG. 5 is a schematic block diagram showing a repeater 502, in which automatic adjustment to control open loop stability can be implemented in accordance with the present invention. The repeater 502 functions in a manner similarly to repeater 202 (FIG. 2) and includes a server antenna 504, a server duplexer 506 a donor duplexer 508 a donor antenna 510 and a reverse link amplifier 521 connected to the server duplexer 506 by an input link 523 and to the donor duplexer 508 by an output link 525. A forward link amplifier 531 is connected to the donor duplexer 508 by a forward link connection input 533 and is connected to the server duplexer 506 by a forward link connection output 535. A server antenna link 541 connects the server antenna 504 to the server duplexer 506 and a donor antenna link 543 connects the donor antenna 510 to the donor duplexer 508.

In the forward operation, the forward link amplifier 531 receives a wireless signal from a base station 566 through donor antenna 510 and duplexer 508, and transmits the signal to the server antenna 504. The server antenna 504 transmits a wireless signal to a WCD 578 such as a mobile phone.

In the reverse operation, the server antenna 504 receives a communication signal from a communication device 578 and transmits the signal to the reverse link amplifier 521 through the duplexer 506 and server antenna link 541. The reverse link amplifier 521 amplifies a communication signal and transmits the signal to the donor antenna 510.

Also depicted in FIG. 5 are power detectors 581, 582 and a microprocessor 585. The microprocessor 585 uses signals from power detectors 581, 582 to determine gain and controls amplifier 521 by causing amplifier 521 to attenuate the gain by use of an attenuator circuit (not separately shown). The microprocessor makes the adjustments in the gain of amplifier 521 in accordance with detected stability as determined by the gain indicated by power detectors 581, 582. By way of example, a change of gain or input power to the amplifier can be introduced, and the attenuation value of the attenuator circuit can be dithered in order to generate a detectable power change.

Figure 6:
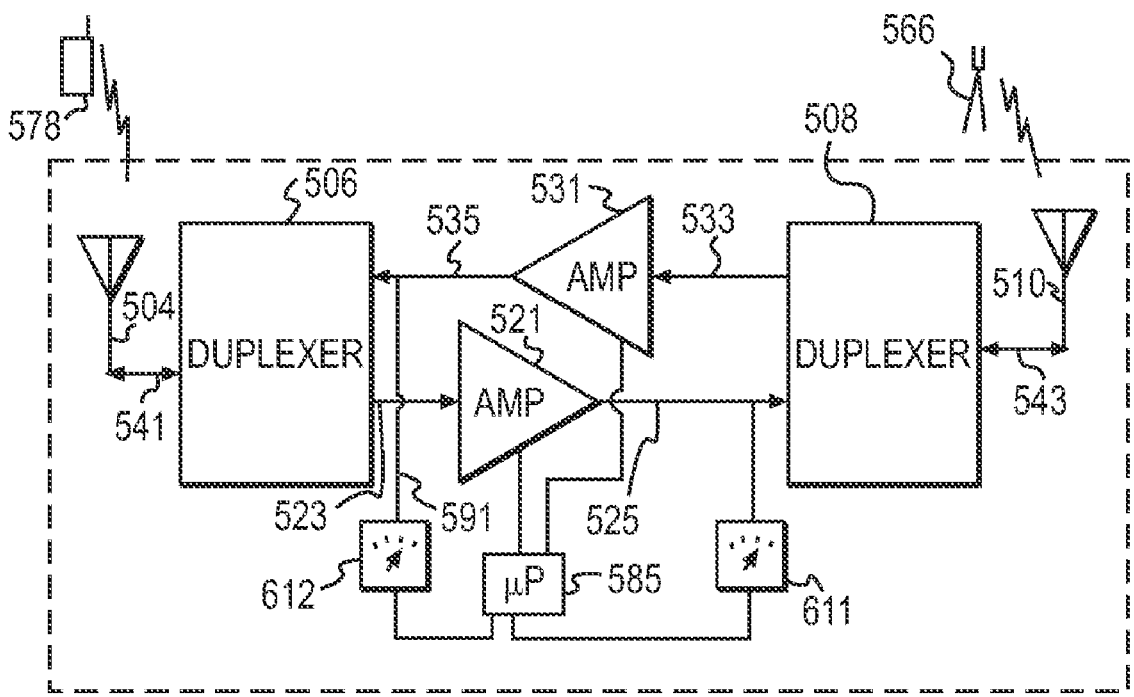
FIG. 6 is a schematic block diagram of a repeater which uses power sensors at the amplifier outputs.

It is possible to accomplish the determination of gain by use of output detectors, as shown in FIG. 6. A repeater 602 includes a pair of power detectors 611, 612. The pair of power detectors 611, 612 are connected directly to the outputs 525, 535 of amplifiers 521, 531. Since the amplifier gain is fixed and known, and since the attenuator value is known via digital command, it is possible to infer the input power. This allows connection of the power detectors 611, 612 without sensing the input power to the amplifiers 521, 531.

An example of a power detector is an LT5534 RF Log Power Detector, providing an output of 40 mV/dBm*Pin(dBm)+2400 mV; this over an input range of −50 to −5 dBm. An example of an attenuator is a Weinschel 4216-63 attenuator.

Referring to FIGS. 5 and 6, it is possible to effect gain control in the forward link and reverse link paths. As shown in FIG. 5, switches 591, 592 are used to permit the integrated power detectors 581, 582 to sense gain across forward link amplifier 531 and reverse link amplifier 521, and to control the gain of the forward and reverse link amplifiers 531, 521. While physical switches 591, 592 and a common set of integrated power detectors 581, 582 are depicted, it is understood that the measurement and control of gain for the forward and reverse directions may involve switching under the control of microprocessor 585, with or without separate integrated power detectors for the forward and reverse directions. The microprocessor 585 functions as a control circuit for the measurement and adjustment functions of the repeater 502. It is also possible to accomplish the measurement and control of gain for the forward and reverse directions using separate control and processor components.

Attenuation Adjustment Procedures

The microprocessor 585 can be used in any convenient manner to control open loop gain, and thereby establish open loop gain stability. According to one technique, the adjustment of open loop gain is achieved by incrementally adjusting attenuation and determining the gain and determining change in gain as a result of the incremental adjustment of attenuation. The result is a change the RF gain in predetermined increments. This enables the microprocessor 585 to detect the threshold of instability and control the amplifier 521 or 531 accordingly.

Figure 7:
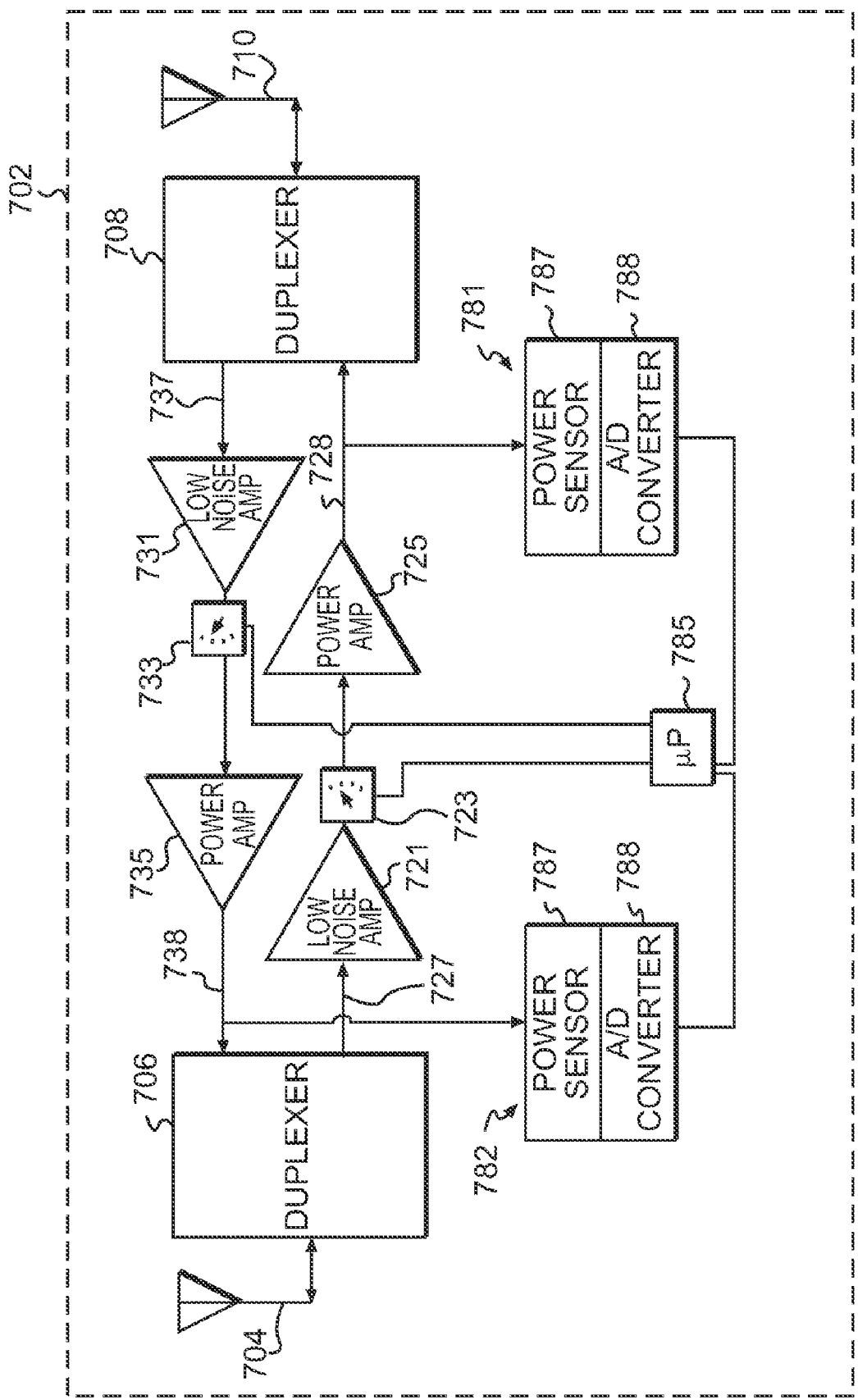
FIG. 7 is a schematic block diagram showing a repeater used in accordance with the present invention.

FIG. 7 is a schematic block diagram showing a repeater 702, in which automatic adjustment is implemented by attenuation. The repeater 702 functions in a manner similarly to repeater 202 and 602 (FIGS. 2 and 6) and includes a server antenna 704, a server duplexer 706 a donor duplexer 708 and a donor antenna 710. A reverse link low noise amplifier 721 provides an output through variable attenuator 723 to a reverse link power amplifier 725. The reverse link low noise amplifier 721 is connected to the server duplexer 706 by an input link 727 and the reverse link power amplifier 725 is connected to the donor duplexer 708 by an output link 728. A forward link low noise amplifier 731 provides an output through variable attenuator 733 to a forward link power amplifier 735. The forward link low noise amplifier 731 is connected to the donor duplexer 708 by an input link 737 and the forward link power amplifier 735 is connected to the server duplexer 706 by an output link 738. The attenuators 723 and 733 are responsive to digital control signals to control gain in the forward and reverse links by attenuating the outputs of the respective low noise amplifiers 721 and 731. An example of a digitally controlled attenuator is a Weinschel 4216-63 attenuator. Variable attenuators that have analog control would also be suitable.

In the forward operation, the forward link low noise amplifier 731 receives a wireless signal from a base station (not shown) through donor antenna 710 and duplexer 708. The signal is attenuated by the forward link variable attenuator 733, and then amplified by the forward link power amplifier 735. The signal from the forward power amplifier 735 is transmitted to the server antenna 704. The server antenna 704 transmits a wireless signal to a WCD (not shown). In the reverse operation, the server antenna 704 receives a communication signal and transmits the signal to the reverse link low noise amplifier 721 through the duplexer 706. The signal is attenuated by the reverse link variable attenuator 723, and then amplified by the reverse link power amplifier 725. The reverse link power amplifier 725 transmits the signal to the donor antenna 710.

Also depicted in FIG. 7 are power detectors 781, 782 and a microprocessor 785. Power detectors 781, 782 include power sensors 787 and A/D converters 788. The processor 785 uses signals from power detectors 781, 782 to determine gain and controls the gain of the repeater 702 by use of an attenuator circuits 723, 733. The microprocessor makes the adjustments in the attenuation of amplifiers 721 731 in accordance with detected stability as determined by the gain indicated by power detectors 781, 782. This effectively controls the gains of the combination of amplifiers 721, 725 and of amplifiers 731, 735. By the use of separate attenuators 723, 733, power control is effected in the forward link in response to conditions detected in the reverse link. It is also possible to adjust both the forward and reverse links in response to an unstable condition in the link determined to be unstable. By adjusting both the forward links, a symmetrical change in gain is effected.

Operation

Figure 8:
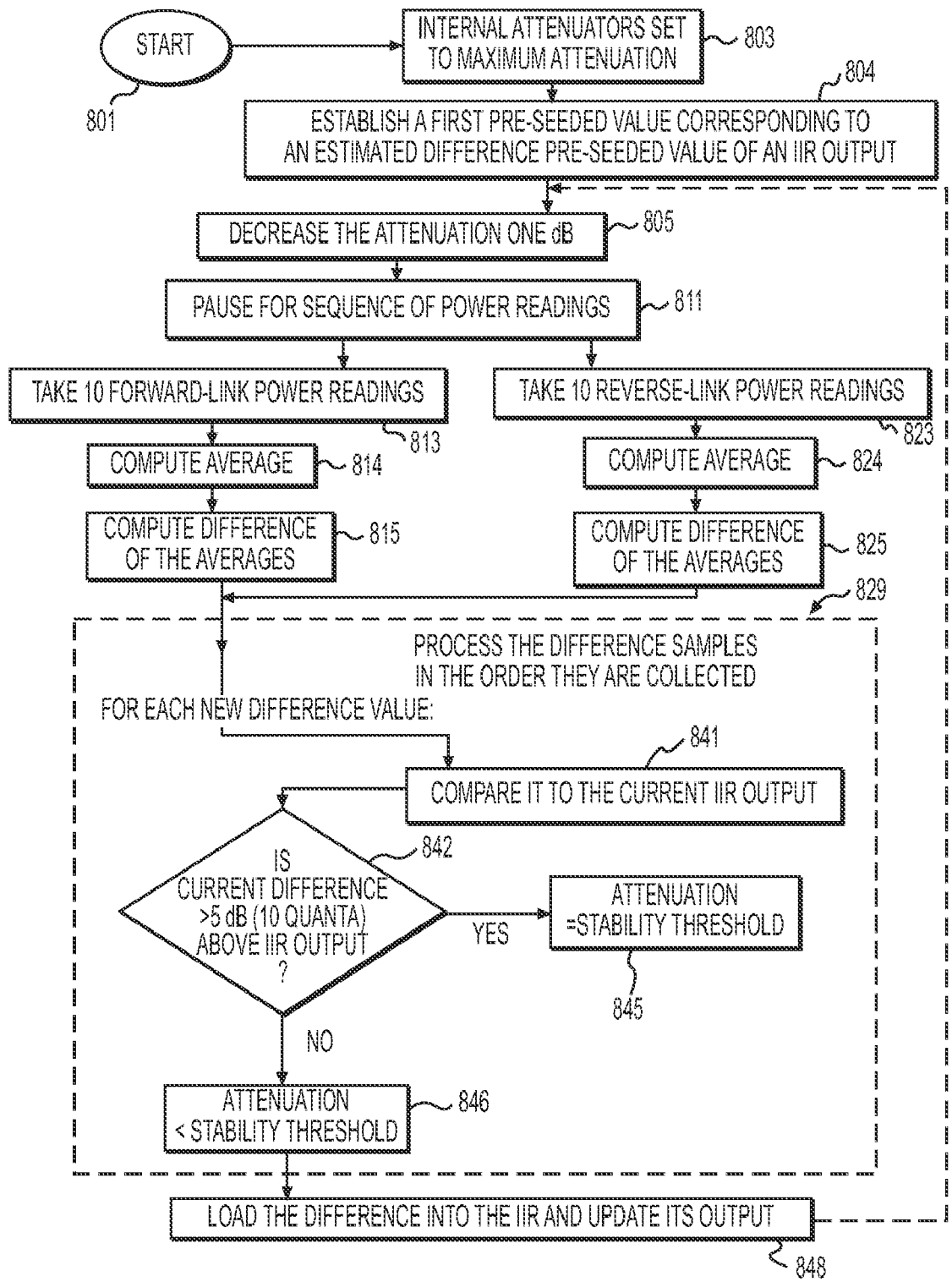
FIG. 8 is a flow diagram depicting an algorithm for detection of a threshold of instability.

FIG. 8 is a flow diagram depicting an algorithm for detection of a threshold of instability. The algorithm depicted in the flow diagram of FIG. 8 can be used for detection of the threshold of instability.

After Start (step 801), the internal attenuators set to maximum attenuation (step 803). A first sample of the power detector value is made (step 804). The attenuation is decreased by a small increment (step 805), pausing (step 811) long enough to take a predetermined sampling set of power readings at each attenuator setting.

One method is to (the installation method) increase the gain of the repeater from its minimum value (maximum attenuator value) to the maximum gain or the point of instability, which ever comes first.

A second method is to perform the gain perturbation when the repeater is in service, by looking at the gain instability in a small region around the nominal operating point of the repeater. The increment is small enough to be considered a fine adjustment in the output of the amplifier but large enough that a series of the incremental steps can be expected to generate results from one or more sequences series of samples. Additionally, the increment is small enough so as to avoid adversely affecting quality of service (QoS) of users, at least in the case of the adjustment being performed "hot", with users online, on a routine basis. An example of a small increment would be 1 dB at a time. One approach to selecting the increment is to determine a change of gain within a range corresponding to the change in gain expected to exist in normal operation of WCDs. That increment is a fine adjustment and is not likely to adversely affect QoS for any users who are online. By way of example, the predetermined sampling set may be 10 forward-link and 10 reverse-link power readings at each attenuation setting. The sampling set is taken for the forward-link power readings (step 813), an average for the forward-link samples is read (step 814) and a difference of the averages for the forward link is computed (step 815). Similarly, the sampling set is taken for the reverse-link power readings (step 823), an average for the reverse-link samples is read (step 824) and a difference of the averages for the reverse link is computed (step 825). The difference samples are then processed (step 829). This is a computation and processing of the first difference of the averages for both forward and reverse links.

The processing (step 829) is performed by comparing the differences to the current IIR output (step 841), followed by determining (step 842) whether the difference between the IIR output is greater than a predetermined threshold. In the example, the threshold is given at 5 dB, but the requirement is that the measured gain step is larger than the perturbation step. If the difference is more than a predetermined threshold above the IIR output, the attenuation is considered to be at the threshold of instability (step 845); otherwise, the attenuation is considered to be less than the threshold of instability (step 846).

The sequence may be continued to a predetermined threshold (step 845) by updating the output (step 848) and repeating the sequence from step 805. Alternatively, the sequence may take the gain to the predetermined threshold (step 845) and then reduce the gain to back away from the oscillation condition. It is also possible to provide a periodic adjustment of the repeater gain on an automated basis. Thus as conditions change either externally or within the repeater, the repeater gain is automatically adjusted.

Functional Operation

Figure 9:
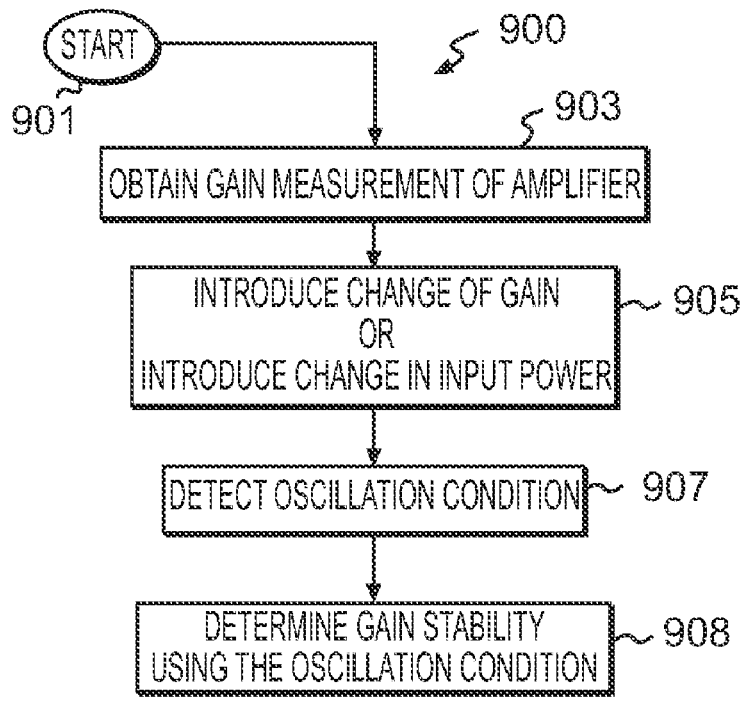
FIG. 9 is a flow chart showing a process measurement of loop gain.

FIG. 9 is a flow chart showing a process 900 for the measurement of loop gain in a signal amplifier used to implement the invention in a communication system. After start (step 901), a gain measurement of the signal amplifier is obtained or the gain measurement of the signal amplifier is obtained (step 903). A change of gain of the signal amplifier is introduced (step 905), and an oscillation condition of a resultant corresponding change of the system or loop gain is detected (step 907). A determination (step 908) is made of gain stability using the oscillation condition of the resultant corresponding change of gain measurement of the system or loop gain.

Figure 10:
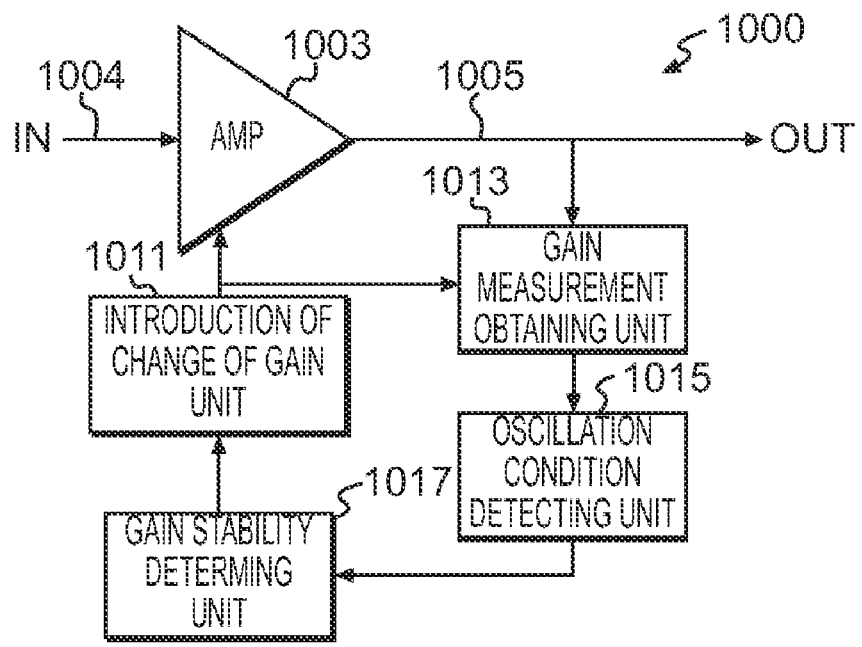
FIG. 10 is a diagram showing the functional operation of the inventive loop gain measurement system.

FIG. 10 is a diagram showing the functional operation of the inventive loop gain measurement system 1000. Depicted are an amplifier 1003 having an input 1004 and an output 1005. Also depicted are an introduction of change of gain unit 1011, a gain measurement obtaining unit 1013, an oscillation conditioning detecting unit 1015, and a gain stability determining unit 1017. The introduction of change of gain unit 1011 causes gain to change in the amplifier 1003, typically by attenuation or by controlling a variable gain circuit in the amplifier. The gain measurement obtaining unit 1013 detects gain of the amplifier 1003 based on detected power and introduced gain. The oscillation conditioning detecting unit 1015 uses the detected gain to detect the oscillation condition. The various functions of the gain unit 1011, gain measurement obtaining unit 1013, oscillation conditioning detecting unit 1015, and gain stability determining unit 1017 may be performed by a microprocessor or by separate units, and may be integrated into the circuitry of the amplifier 1003.

Additional Variations

A less complex algorithm may also be implemented, concurrently, by eliminating the IIR filter and simply comparing the new difference to the previous value and watching for a step change of above the predetermined threshold (e.g., 5 dB or more). This is similar to that depicted in FIG. 8, except that the IIR output is not used for the comparison. Depending on the environment that the repeater operates in, no filtering or other types (FIR, Boxcar, simple averaging), would be appropriate.

It is also possible to accomplish the results by dithering the amplifier gain or attenuation in a more random fashion. In doing so, a range of amplifier gain is selected, and the gain is dithered within that range to determine if each change results in open loop instability.

It is possible to establish a relationship between open loop instability in the forward and reverse links, since most variables relative to open loop feedback affect both links. This permits sensing of feedback in the link determined as the critical link to be used to control both links. Referring again to FIG. 5, if the forward and reverse 521, 531 are adjusted so that one of the amplifiers, e.g., amplifier 521, is most critical with respect to open link instability, it is possible to control open link instability by adjusting both amplifiers 521, 531 according to parameters measured on one link (forward or reverse link). This works so long as the open loop instability is measured on the most critical link as far as open loop instability is concerned, and the attenuation of both amplifiers is controlled in a coordinated manner. In FIG. 5, this is accomplished by leaving switches 591, 592 in a sensing position for one link, but controlling both amplifiers 521, 531 with microprocessor 585.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

The invention claimed is:

1. A method for measuring loop gain in a communication system, the method comprising:
    obtaining a gain measurement of a signal amplifier;
    introducing a change of gain or input power to the signal amplifier;
    detecting an oscillation condition of a resultant corresponding change of gain measurement of the signal amplifier based on whether the resultant corresponding change of gain measurement is proportionate to the introduced change of gain or input power; and
    determining gain stability using the oscillation condition of the resultant corresponding change of gain measurement of the signal amplifier.

2. The method of claim 1 further comprising adjusting the gain when the oscillation condition of the resultant corresponding change falls outside of a predetermined threshold of stability so that the oscillation condition of the resultant corresponding change falls within the predetermined threshold of stability or the resultant corresponding change falls below a threshold of measured instability.

3. The method of claim 1 wherein the resultant corresponding change of gain exceeding the threshold of measured instability provides an indication of the conditions conductive to oscillation.

4. The method of claim 3 further comprising responding to the indication of conditions conducive to oscillation by effecting adjustments to a signal path of the communication system to reduce open loop gain and increase stability.

5. The method of claim 1 further comprising adjusting the gain by repeating adjustment of the gain in predetermined increments, and after each increment detecting the oscillation condition until the resultant corresponding change reaches the predetermined threshold of instability or above a threshold of measured instability.

6. The method of claim 5 further comprising responding to a detected oscillation condition by incrementally decreasing gain in predetermined increments until the resultant corresponding change falls within the predetermined threshold of stability or below the threshold of measured instability.

7. The method of claim 1 further comprising: introducing a negative change of gain or input power when the resultant corresponding change of loop gain approaches unity (or 0 dB); and
    adjusting the gain until the resultant corresponding change of gain falls below a threshold of measured instability.

8. The method of claim 1 wherein detecting an oscillation condition comprises:
    checking an output of the amplifier to determine if the power increased or decrease a like amount corresponding to the resultant change of gain; and
    adjusting the gain when the oscillation condition of the resultant corresponding change falls outside of a predetermined threshold of stability so that the oscillation condition of the resultant corresponding change falls within a predetermined threshold of stability.

9. The method of claim 1 wherein introducing a change of gain or input power to the amplifier comprises dithering the value of an attenuator connected to the input of the amplifier sufficiently to generate a detectable power change;
    wherein detecting an oscillation condition of a resultant corresponding change of gain measurement of the amplifier comprises determining the amount of power change using a power detector connected to the amplifier; and wherein determining gain stability comprises determining if the power change has a similar proportion to the dithering, and in the case of the power changes larger than the attenuator dither, reducing the amplifier gain to prevent oscillation.

10. A device that measures loop gain in a signal path which includes an amplifier, the device comprising:
an input device in communication with an input of the amplifier that introduces a change of gain or input power to the amplifier;
a detector in communication with an output of the amplifier that obtains a gain measurement of the amplifier; and
a control circuit in communication with the detector that detects an oscillation condition of a resultant corresponding change of gain measurement of the amplifier based on whether the resultant corresponding change of gain measurement is proportionate to the introduced change of gain or input power and determines gain stability using the oscillation condition of the resultant corresponding change of gain measurement of the amplifier.

11. The device of claim 10 wherein the control circuit adjusts the gain when the oscillation condition of the resultant corresponding change falls outside of a predetermined threshold of stability so that the oscillation condition of the resultant corresponding change falls within the predetermined threshold of stability or the oscillation condition of the resultant corresponding change falls below a threshold of measured instability.

12. The device of claim 10 wherein:
the resultant corresponding change of gain exceeding the threshold of measured instability provides an indication of the conditions conductive to oscillation; and
the control circuit responds to the indication of conditions conducive to oscillation by effecting adjustments to the signal amplifier to reduce open loop gain and increase stability.

13. The device of claim 10 wherein the control circuit adjusts the gain by repeating adjustment of the gain in predetermined increments, and after each increment detecting the oscillation condition until the resultant corresponding change reaches the predetermined threshold of instability or falls above a threshold of measured instability.

14. The device of claim 10 wherein the control circuit introduces a negative change of gain or input power when the resultant corresponding change of loop gain approaches unity (or 0 dB); and
adjusts the gain until the resultant corresponding change of gain falls below a threshold of measured instability.

15. The device of claim 10 wherein the control circuit detects an oscillation condition by checking an output of the amplifier to determine if the power increased or decrease a like amount corresponding to the resultant change of gain; and
by adjusting the gain when the oscillation condition of the resultant corresponding change falls outside of a predetermined threshold of stability so that the oscillation condition of the resultant corresponding change falls within a predetermined threshold of stability.

16. The device of claim 10 wherein the input device introduces a change of gain or input power to the amplifier by dithering the value of the input of the amplifier sufficiently to generate a detectable power change; and wherein the control circuit detects an oscillation condition of a resultant corresponding change of gain measurement of the amplifier comprises determining the amount of power change using a power detector connected to the amplifier, and determines gain stability by determining if the power change has a similar proportion to the dithering, and in the case of the power changes larger than the attenuator dither, reducing the amplifier gain to prevent oscillation.

17. The device of claim 10 wherein the input device includes an attenuator.

18. The device of claim 10 wherein the detector includes a power detector.

19. A non-transitory program storage device readable by a machine tangibly embodying a program of instruction executable by the machine to perform method steps for operating a signal amplifier, the method steps comprising:
obtaining a gain measurement of the signal amplifier;
introducing a change of gain or input power to the signal amplifier;
detecting an oscillation condition of a resultant corresponding change of gain measurement of the signal amplifier based on whether the resultant corresponding change of gain measurement is proportionate to the introduced change of gain or input power; and
determining gain stability using the oscillation condition of the resultant corresponding change of gain measurement of the signal amplifier.

20. The computer program product of claim 19, the method steps further comprising adjusting the gain when the oscillation condition of the resultant corresponding change falls outside of a predetermined threshold of stability so that the oscillation condition of the resultant corresponding change falls within the predetermined threshold of stability or the oscillation condition of the resultant corresponding change falls below a threshold of measured instability.

21. The computer program product of claim 19 wherein the resultant corresponding change of gain exceeding the threshold of measured instability provides an indication of the conditions conductive to oscillation.

22. The computer program product of claim 19, the method steps further comprising responding to the indication of conditions conducive to oscillation by effecting adjustments to the signal amplifier to reduce open loop gain and increase stability.

23. The computer program product of claim 19, the method steps further comprising adjusting the gain by repeating adjustment of the gain in predetermined increments, and after each increment detecting the oscillation condition until the resultant corresponding change reaches the predetermined threshold of instability or falls above a threshold of measured instability.

24. The computer program product of claim 23, the method steps further comprising responding to a detected oscillation condition by incrementally decreasing gain in predetermined increments until the resultant corresponding change falls within the predetermined threshold of stability or below the threshold of measured instability.

25. The computer program product of claim 19, the method steps further comprising:
a routine for introducing a negative change of gain or input power when the resultant corresponding change of loop gain approaches unity (or 0 dB); and
a routine for adjusting the gain until the resultant corresponding change of gain falls below a threshold of measured instability.

26. The computer program product of claim 19 wherein detecting an oscillation condition comprises:
- checking an output of the amplifier to determine if the power increased or decrease a like amount corresponding to the resultant change of gain; and
- adjusting the gain when the oscillation condition of the resultant corresponding change falls outside of a predetermined threshold of stability so that the oscillation condition of the resultant corresponding change falls within a predetermined threshold of stability.

27. The computer program product of claim 19 wherein introducing a change of gain or input power to the amplifier comprises dithering the value of an attenuator connected to the input of the signal amplifier sufficiently to generate a detectable power change;
- wherein detecting an oscillation condition of a resultant corresponding change of gain measurement of the amplifier comprises determining the amount of power change using a power detector connected to the signal amplifier; and
- wherein determining gain stability comprises determining if the power change has a similar proportion to the dithering, and in the case of the power changes larger than the attenuator dither, reducing the amplifier gain to prevent oscillation.

28. A system for measuring loop gain in a signal path which includes an amplifier, the system comprising:
- means for obtaining a gain measurement of the amplifier;
- means for introducing a change of gain or input power to the amplifier;
- means for detecting an oscillation condition of a resultant corresponding change of gain measurement of the amplifier based on whether the resultant corresponding change of gain measurement is proportionate to the introduced change of gain or input power; and
- means for determining gain stability using the oscillation condition of the resultant corresponding change of gain measurement of the amplifier.

29. The system of claim 28 further comprising means for adjusting the gain when the oscillation condition of the resultant corresponding change falls outside of a predetermined threshold of stability so that the oscillation condition of the resultant corresponding change falls within the predetermined threshold of stability or the oscillation condition of the resultant corresponding change falls below a threshold of measured instability.

30. The system of claim 28 further comprising means for responding to the indication of conditions conducive to oscillation by effecting adjustments to the amplifier to reduce open loop gain and increase stability, wherein the resultant corresponding change of gain exceeding the threshold of measured instability provides an indication of the conditions conductive to oscillation.

31. The system of claim 28 further comprising means for adjusting the gain by repeating adjustment of the gain in predetermined increments, and after each increment detecting the oscillation condition until the resultant corresponding change reaches the predetermined threshold of instability or above a threshold of measured instability.

32. The system of claim 31 further comprising means for responding to a detected oscillation condition by incrementally decreasing gain in predetermined increments until the resultant corresponding change falls within the predetermined threshold of stability or below the threshold of measured instability.

33. The system of claim 28 further comprising:
- means for introducing a negative change of gain or input power when the resultant corresponding change of loop gain approaches unity (or 0 dB); and
- means for adjusting the gain until the resultant corresponding change of gain falls below a threshold of measured instability.

34. The system of claim 28 wherein the means for detecting an oscillation condition comprises:
- means for checking an output of the amplifier to determine if the power increased or decrease a like amount corresponding to the resultant change of gain; and
- means for adjusting the gain when the oscillation condition of the resultant corresponding change falls outside of a predetermined threshold of stability so that the oscillation condition of the resultant corresponding change falls within a predetermined threshold of stability.

35. The system of claim 28 wherein the means for introducing a change of gain or input power to the amplifier comprises means for dithering the value of an attenuator connected to the input of the amplifier sufficiently to generate a detectable power change;
- wherein the means for detecting an oscillation condition of a resultant corresponding change of gain measurement of the amplifier comprises means for determining the amount of power change using a power detector connected to the amplifier; and
- wherein the means for determining gain stability comprises means for determining if the power change has a similar proportion to the dithering, and in the case of the power changes larger than the attenuator dither, reducing the amplifier gain to prevent oscillation.

* * * * *